March 31, 1964 C. H. PRUITT 3,127,518
SERVICE VEHICLE ELECTRICAL SUPPLY APPARATUS
Filed May 7, 1962 3 Sheets-Sheet 1

INVENTOR.
CARY H. PRUITT
BY Fishburn and Gold
ATTORNEYS

March 31, 1964 C. H. PRUITT 3,127,518
SERVICE VEHICLE ELECTRICAL SUPPLY APPARATUS
Filed May 7, 1962 3 Sheets-Sheet 2

INVENTOR.
CARY H. PRUITT
BY
Fishburn & Gold
ATTORNEYS

March 31, 1964 C. H. PRUITT 3,127,518
SERVICE VEHICLE ELECTRICAL SUPPLY APPARATUS
Filed May 7, 1962 3 Sheets-Sheet 3
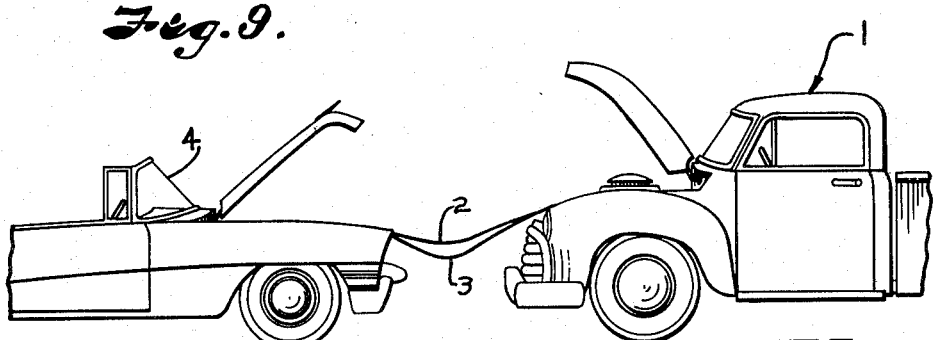
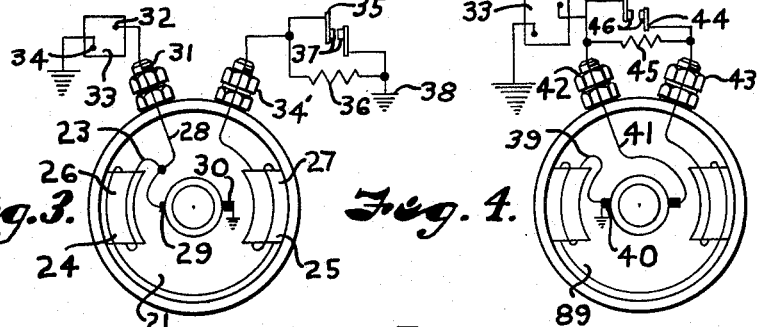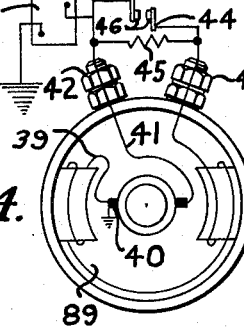
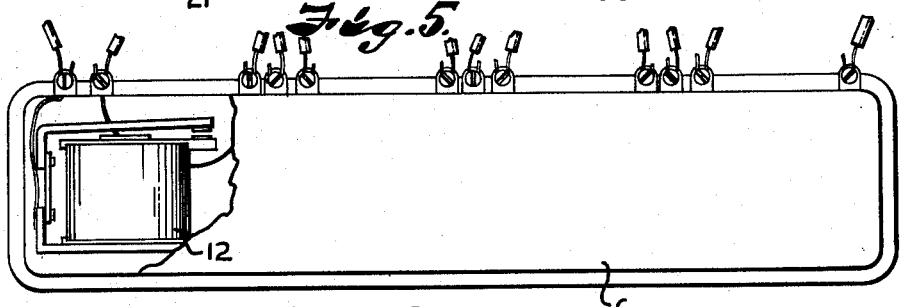
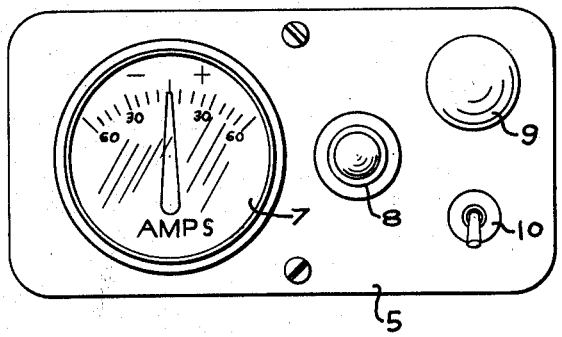
INVENTOR.
CARY H. PRUITT
BY
*Fishburn and Gold*
ATTORNEYS United States Patent Office 3,127,518
Patented Mar. 31, 1964

3,127,518
SERVICE VEHICLE ELECTRICAL SUPPLY
APPARATUS
Cary H. Pruitt, 114 E. Okmulgee, Muskogee, Okla.
Filed May 7, 1962, Ser. No. 192,883
8 Claims. (Cl. 290—50)

This invention relates to electrical supply devices such as battery chargers, and more particularly to apparatus adapted for assembly with emergency service vehicles for supplying electricity to stalled vehicles.

Heretofore, in servicing stalled vehicles on the road, one of two procedures were followed when a source of electricity was required. The most common procedure was to carry a substantially fully charged battery in the service vehicle and connect same to the stalled vehicle battery to obtain sufficient power for cranking the engine for the stalled vehicle. This often proved to be unsatisfactory because of variations between the normal or design voltage of the stalled vehicle electrical system and the voltage of the charged service battery or insufficient current was available from the service battery to accomplish the desired result. The other procedure was to carry in the service vehicle a motor-generator set by which current could be supplied in the desired quantity for the stalled vehicle. The latter procedure was generally unsatisfactory because such motor-generator sets are expensive, heavy to haul, and take up a considerable amount of valuable space in the service vehicle.

The principal objects of the present invention are: to provide electrical apparatus adapted to be assembled with emergency service vehicles for utilizing the standard equipment generator of the service vehicle to produce a source of current for a stalled vehicle; to provide such apparatus which electrically isolates the service vehicle generator from the service vehicle electrical system so that all the output of said generator may be utilized for the stalled vehicle; to provide such electrical apparatus which is adapted for use both on emergency vehicles of the type including generator-regulator circuits having a regulator field resistance and regulator contact points connected in parallel between the field terminal and ground known as a "type A" system, and on emergency vehicles of the type having generator-regulator circuits having a regulator field resistance and regulator contact points connected in parallel between the field terminal and the load output terminal known as a "type B" system; to provide such electrical apparatus whereby the service vehicle is adapted to impress the output of the service vehicle generator onto a foreign electrical system in a safe controlled manner and within wide limits regardless of the design voltage of the foreign electrical system; to provide such electrical apparatus which is quickly and easily installed in a service vehicle requiring only very slight alterations or modifications in the vehicle; to provide such apparatus which permits a service vehicle battery generator to be used for additional purposes such as welding; and to provide such apparatus which is simple in design, low in cost and yet highly reliable and rugged in use.

Other objects and advantages of this invention will become apparent from the following description taken in connection with the accompanying drawings wherein are set forth by way of illustration and example certain embodiments of this invention.

FIG. 3 is a simplified schematic circuit diagram illustrating a "type A" generator-regulator circuit.

FIG. 4 is a simplified schematic circuit diagram illustrating a "type B" generator-regulator circuit.

FIG. 5 is an elevational view of a relay switch bank forming a part of this invention with a portion broken away showing a typical relay switch on the interior thereof.

FIG. 6 is an elevational view of a control panel forming a part of this invention for mounting in a convenient position on the service vehicle.

FIGURE 9 is an elevational view illustrating the cable connections between a service vehicle employing the invention and a stalled vehicle.

Figure 1:
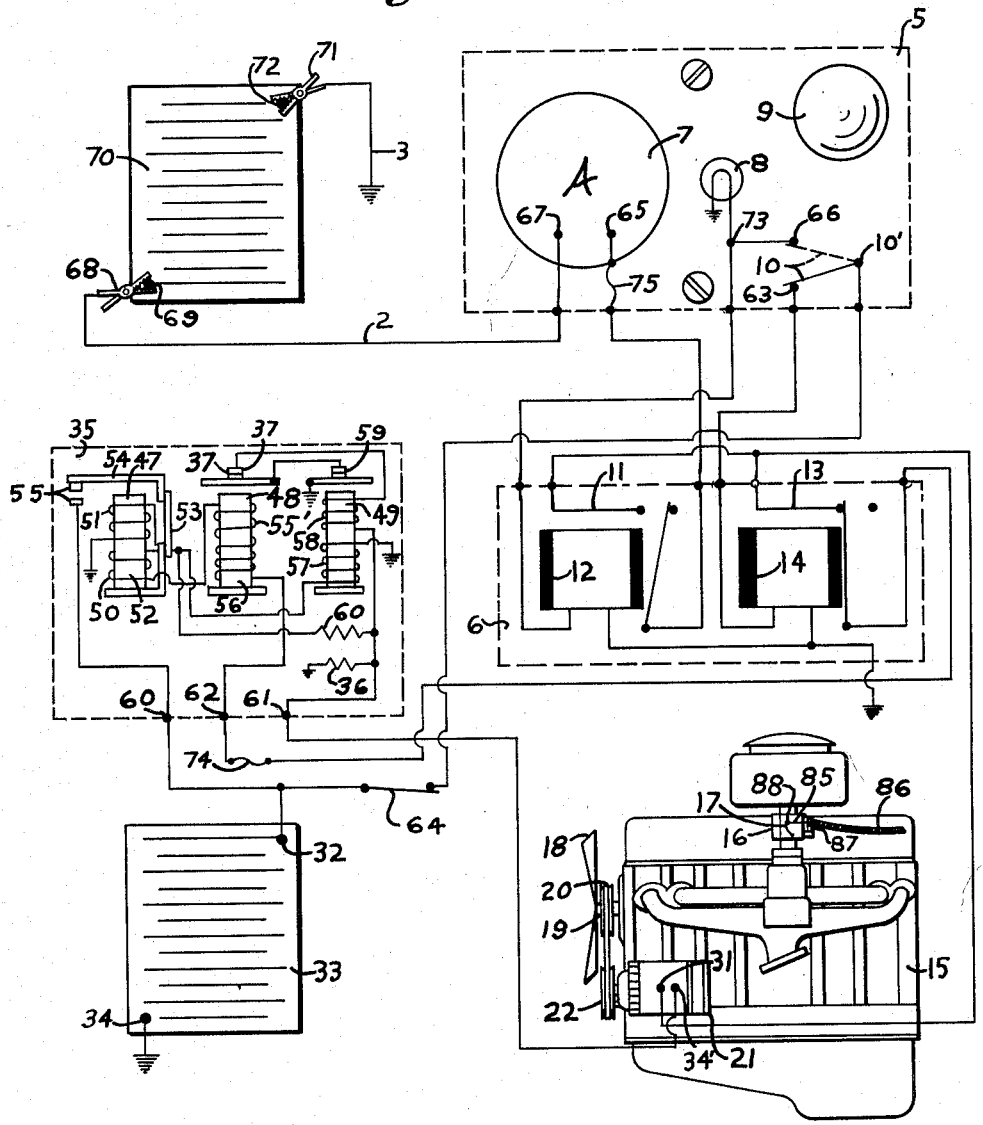
FIG. 1 is a schematic circuit diagram showing electrical apparatus embodying this invention connected into a "type A" electrical system on a service vehicle and charging the battery of a stalled vehicle.

Referring to the drawings in more detail:

The reference numeral 1 generally indicates an emergency service vehicle including apparatus embodying this invention and electrically connected by means of cables 2 and 3 to a stalled vehicle 4 for impressing electric current onto the electrical system of the stalled vehicle. The service vehicle 1 may include the common generator-regulator circuit having a regulator field resistance and regulator contact points connected in parallel between the field terminal and ground, generally known as a "type A" electrical system (FIG. 3), or the service vehicle may include a less common but not unusual generator-regulator circuit having a regulator field resistance and regulator contact points connected in parallel between the field terminal and the load output terminal of the service vehicle generator, generally known as the "type B" system (FIG. 4).

By way of explanation, generators used on the vast majority of modern automotive vehicles are of the shunt type wherein the field is shunted across the armature to obtain a greater output at a low speed range than would be available in other types of generators and, also, to insure full output when required through the high speed range. Such automotive shunt generators sometimes differ in important respects but in all types the field coils of the generator are connected substantially directly to at least one main armature brush, and some external means of controlling generator output must be used to prevent the generator from exceeding its rated maximum voltage or current. Therefore, these shunt generators commonly use current and voltage regulators which operate to prevent output voltage and current from exceeding predetermined design limits. The regulators must vary in structure to conform to variations in such generators, however, all function on the same basic principle, which is, inserting resistance into the generator field circuit to reduce voltage or current as required by operating conditions.

A schematic circuit diagram showing electrical apparatus embodying this invention assembled in a service vehicle electrical system is illustrated in FIG. 1 and includes a control panel 5, a relay switch band 6 and the charging cables 2 and 3. The control panel 5 includes an ammeter 7, a pilot light 8, an engine throttle or speed lock control 9, and a manually operated single pole-double throw control switch 10. The relay switch bank 6, in the example illustrated in FIG. 1, contains a first relay switch 11 having an actuating coil 12 and a second relay switch 13 having an actuating coil 14.

The control panel 5, relay switch bank 6 and charging cables 2 and 3 are assembled and connected with portions of the emergency service vehicle 1 in a manner and for reasons described below. The service vehicle 1 includes an engine 15 having a carburetor 16 with a throttle arm 17 for controlling the speed thereof in the usual manner. The engine 15 also includes a cooling fan 18 fixed with respect to a rotating pulley 19 which is engaged with a drive belt 20. Mounted on the block of the engine 15 is a generator 21 having a pulley 22 fixed on the drive shaft thereof and also engaging the drive belt 20 whereby as the engine 15 rotates the pulley 19, the generator 21 is driven.

A simplified schematic wiring diagram illustrating a "type A" generator-regulator circuit is shown in FIG. 3 wherein the generator 21 has a field circuit 23 forming field coils 24 and 25 about respective pole shoes 26 and 27. The generator 21 also has a generator armature or output circuit 28 having an insulated brush 29 and a grounded brush 30. The output circuit 28 connects through an output terminal 31 to a selected terminal 32 of the service vehicle battery 33 which also has a terminal 34 grounded in the usual manner. The field circuit 23 is connected to the generator output circuit 28 adjacent the main insulated brush 29 and is insulated in the generator. The field circuit 23 is connected through a generator field terminal 34' to a simplified schematic diagram of a regulator 35. The regulator 35 includes a field resistance 36 and regulator contact points 37 connected in parallel between the field terminal 34' and ground at 38. This is in contrast with the heavy-duty or "type B" generator-regulator circuit illustrated in FIG. 4 wherein the field circuit 39 is connected to a grounded brush 40 or, in other words, the field is grounded internally rather than in the regulator circuit. The generator armature or output circuit 41 connects through a generator output terminal 42 to the battery 33 and the generator field terminal is designated 43. The regulator 44 of the "type B" circuit has a regulator field resistance 45 and regulator contact points 46 connected in parallel between the field terminal 43 and the generator load output terminal 42. The electrical apparatus embodying this invention as used with the "type A" electrical system is described hereinafter with reference to FIG. 1 and as used with the "type B" system with reference to FIG. 2.

Referring to FIG. 1, the regulator 35 is illustrated in more complete fashion and includes a cut-out relay 47, a current regulator 48 and a voltage regulator 49. The cut-out relay 47 has a series winding 50 and a shunt winding 51 assembled on a single core 52. The shunt winding 51 is shunted across the generator 21 so that the generator voltage is impressed upon the winding 51 at all times when the regulator 35 is connected in the circuit. The series winding 50 is connected in series with the charging circuit so that the generator output passes therethrough. When the voltage of the generator 21 builds up to a value great enough to charge the battery, the induced magnetism in the core 52 becomes sufficient to overcome the tension of a spring 53 and pulls the armature 54 toward the core 52 for closing the contact points 55. When the points 55 close, the current which travels from the generator to the battery 33 passes through the series winding 50 to add to the magnetism holding the contact points 55 closed. When the generator slows down or stops, current reverses and flows from the battery to the generator which produces a magnetic field opposing the field produced by the shunt winding 51 and the points 55 separate to prevent the battery from discharging through the generator.

The current regulator 48 has a series winding 55' on a core 56 and adapted to open the contacts 37 when the generator reaches a predetermined output. When the points 37 open, the resistance 36 is inserted into the generator field circuit so that the generator output is reduced.

The voltage regulator 49 has a shunt winding 57 which is shunted across the generator output through the windings 50 and 55' and a series winding 58 which is connected in series with the generator field circuit when the regulator contact points 37 are closed. When the generator voltage reaches a predetermined value, the magnetic field produced by the two windings 57 and 58 open the contact points 59 so that they separate and insert the resistance 36 into the generator field circuit so that the generator field current and voltage are reduced. A resistor 60 is connected between the generator field and the frame of the cut-out relay 47 to help dissipate the surge of induced voltage produced in the field coils as the strength of the magnetic field changes therein, to prevent excess arcing of contact points.

The regulator 35 is electrically connected to the service vehicle battery 33 at a regulator output or battery terminal 60. The generator field terminal 34' is connected to a regulator field terminal 61 and the output terminal 31 of the generator is normally connected to the regulator input or armature terminal 62 but is adapted to be automatically disconnected therefrom for charging the electrical systems of stalled vehicles or other purposes described hereinafter.

The connection between the output terminal 31 of the generator and the armature terminal 62 of the regulator 35 includes the contacts of the second relay switch 13. The actuating coil 14 of the relay switch 13 is adapted to receive power from the service vehicle battery 33 when the switch 10 is in the position indicated by arm contact with the "normal" terminal 63 and the ignition accessory switch 64, connected between the battery 33 and the common terminal 10' of the switch, is closed. The application of power to the actuating coil 14 closes the circuit through the switch 13 permitting the regulator 35 to operate for regulating the output of the generator 21 in the normal manner, as for example, when the service vehicle is being driven.

The contacts of the first relay switch 11 are connected between the generator output terminal 31 and the input terminal 65 of the ammeter 7. The actuating coil 12 of the first relay switch 11 is connected to the "charge" terminal 66 of the switch 10. The output terminal 67 of the ammeter 7 is connected to the cable 2 which terminates, in the illustrated example, in a clamp 68 for electrically securing the cable 2 to the terminal 69 of a battery 70 contained in the electrical circuit of the stalled vehicle 4. The charging cable 3 is suitably grounded in the service vehicle and terminates at the other end thereof in a clamp 71 for providing electrical continuity through the battery 70. The pilot light 8 is grounded at one side thereof and connected at the other side at 73 with the "charge" terminal 66 of the switch 10. Suitable fuses 74 and 75 are provided in the generator output circuits to protect same in case of overload.

Figure 8:
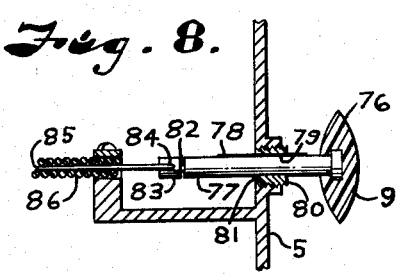
FIG. 8 is a sectional view in side elevation showing an engine throttle lock control for controlling the engine speed of the service vehicle and forming a part of the control panel.
Figure 7:
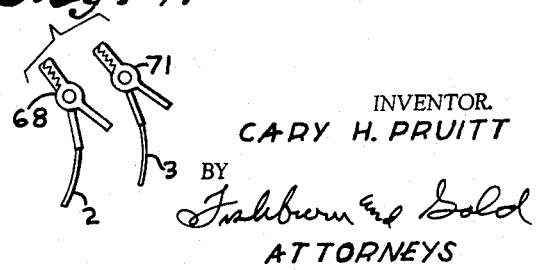
FIG. 7 is an elevational view illustrating a pair of charging cables adapted to be connected between the service vehicle and the electrical system of a stalled vehicle.

The engine speed lock control 9 is best shown in FIG. 8 and, in the illustrated example, comprises a knob 76 fixed to a shaft 77 adapted to longitudinally slidably move with respect to the control panel 5. The shaft 77 carries a suitable key 78 longitudinally thereof and adapted to engage in a slot 79 in a split nut 80. The split nut 80 is threadedly engaged in tapered threads 81 extending through the panel 5 whereby when the split nut 80 is rotated with respect to the control panel 5 it frictionally engages the shaft 77 to fix the longitudinal position of the shaft. The rear end 82 of the shaft 77 has a swivel 83 assembled therewith and adapted to receive one end 84 of a flexible control wire 85. The control wire 85 is slidably retained coaxially within flexible sheath 86 which extends into the service vehicle motor compartment and is anchored adjacent the carburetor 16 at 87. The other end 88 of the control wire 85 is suitably engaged with the throttle arm 17 whereby the position of the throttle arm is controlled by the relative position of the shaft 77. It is to be understood that by twisting the knob 76 in one direction the shaft 77 is released for longitudinal movement with respect to the split nut 80 and when the desired position thereof is obtained the knob 76 may be rotated in the opposite direction to lock the shaft with respect to the control panel 5. The panel 5 may be located in any convenient position on the service vehicle 1, for example, the dashboard or within the engine compartment.

By way of operation with regard to a service vehicle having a "type A" electrical system, the switch 10 is maintained in contact with the terminal 63 for normal operation of the vehicle. Upon arrival at the service call scene, the cables 2 and 3 are connected to the stalled vehicle battery and the switch 10 is thrown so that contact is made with the charging terminal 66. This deactuates the switch 13 and removes the output terminal 31 of the generator 21 from the armature terminal 62 of the regulator 35. The generator field terminal 34', however, remains connected to the regulator field terminal 61 whereby it is grounded within the regulator 35 and, due to the lack of sufficient current flow in the coils 55' and 57, the contacts 37 and 59 will remain closed, keeping the generator field grounded regardless of generator output. The switch contact with the charge terminal 66 also turns on the pilot light 8 to indicate the charging system is on and powers the actuating coil 12 of the first relay switch 11, completing a circuit through the relay switch 11. This introduces the generator output current into the ammeter 7 through which the current flows into the battery 70 of the stalled vehicle. The current flow into the stalled vehicle is controlled by controlling the engine speed and, therefore, the generator speed of the service vehicle by the speed lock control 9. The desired voltage across the battery 70 and, therefore, the desired voltage across the entire electrical system of the stalled vehicle, is assured by monitoring the current flowing through the ammeter 7, the rated current input to a depleted battery producing a safe voltage thereacross. Thus, for example, 6-volt, 12-volt and 24-volt systems may be serviced without danger of over-voltage. Other jobs requiring low voltage D.C. power, such as welding, may also be performed. Monitoring the generator output with the ammeter 7 also insures that the service vehicle generator 21 will not be dangerously overloaded. Upon completion of the charging operation, the charging cables 2 and 3 are returned to the service vehicle, the speed lock 9 released and the switch 10 is returned in contact with the terminal 63 which permits the service vehicle to again be operated over the road in the normal manner.

Figure 2:
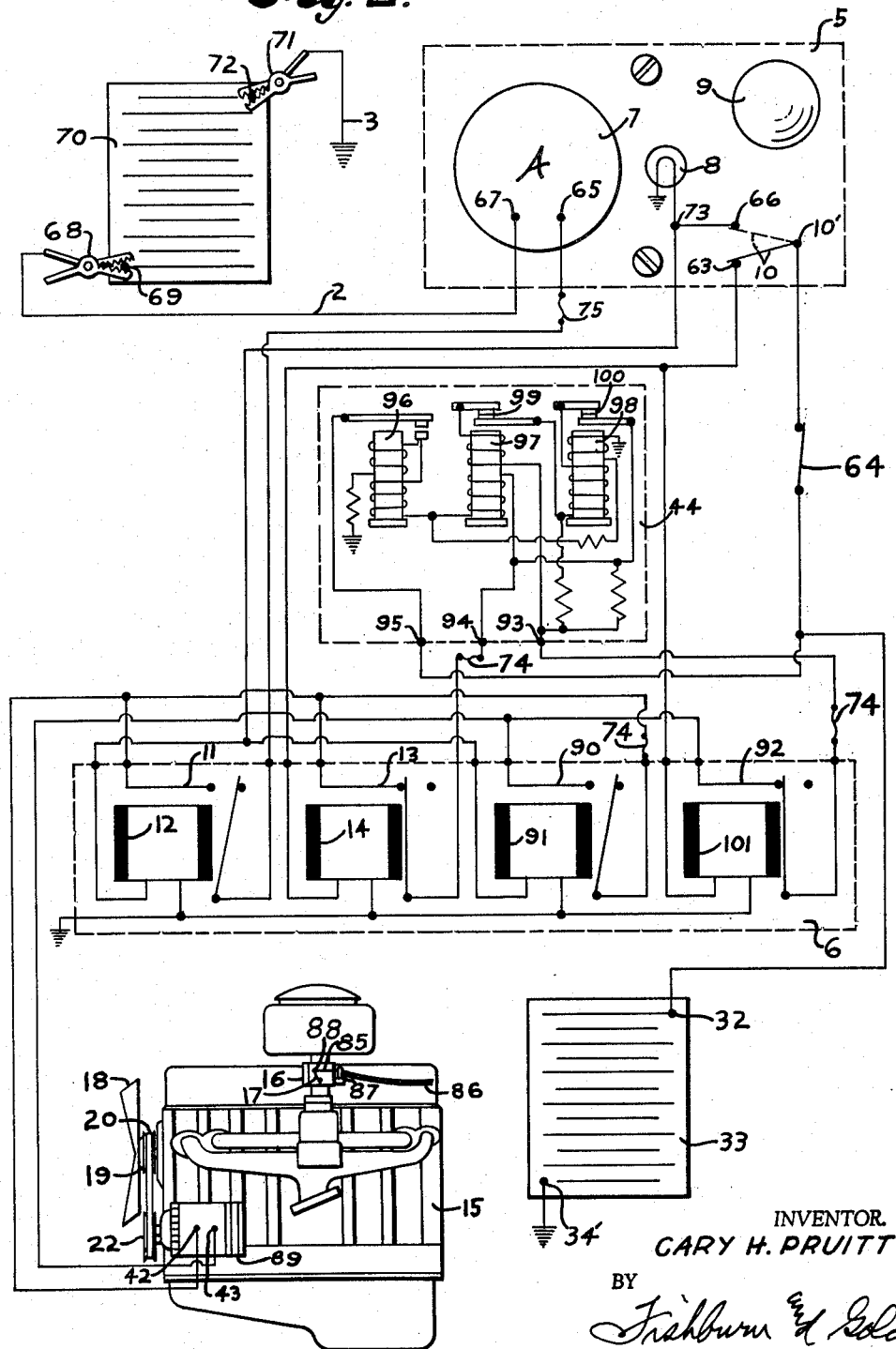
FIG. 2 is a schematic circuit diagram showing electrical apparatus embodying this invention connected into a "type B" electrical system on a service vehicle.

Referring to FIG. 2, electrical apparatus embodying this invention is shown assembled in an emergency service vehicle having an electrical system of the "type B" circuit and reference numerals similar to those in FIG. 1 are used where applicable. The generator 89 includes the field terminal 43 and the generator output terminal 42 noted above with respect to FIG. 4. The generator output terminal 42 is connected, as with the "type A" system, to the first relay switch 11 and the second relay switch 13 but is also connected to one side of a third relay switch 90, the purpose of which will become apparent hereinafter. The actuating coil 91 of the third relay switch 90 is connected to the "charge" terminal 66 of the switch 10 with the actuating coil of the first relay switch 11. The field terminal 43 of the generator 89 is connected to the other side of the third relay switch 90 and also to one side of a fourth relay switch 92. The other side of the fourth relay switch 92 is connected to the field terminal 93 of the "type B" regulator 44. The armature terminal 94 of the regulator 44 is connected to the second relay switch 13 and the battery terminal 95 of the regulator 44 is connected to the battery 33 of the service vehicle as with the "type A" circuit.

The regulator 44 contains a cut-out relay 96, a current regulator 97 and a voltage regulator 98 as described above in connection with the "type A" regulator 35 but with the important difference that the field terminal 93 is connected through the current regulator contacts 99 and the voltage regulator contacts 100 to the armature terminal 94 rather than to ground. In order to operate the generator 89 for charging a stalled vehicle electrical system, it is necessary to disconnect both the output terminal 42 and field terminal 43 from the regulator 44 and connect said terminals together externally of the regulator. The latter is accomplished by means of a third and a fourth relay switch 90 and 92 respectively as is now described. The contacting of the switch 10 with the charging terminal 66 actuates the coil 91 of the third relay switch 90 which connects the output and field terminals 42 and 43 of the generator 89 together. The movement of the switch 10 to the charging terminal 66 removes the power connection of the fourth relay switch actuating coil 101 from the terminal 63 which disconnects the generator field terminal 43 from the regulator field terminal 93. The armature terminal 94 of the regulator 44 is disconnected from the generator 89 by means of the second relay switch as noted above with respect to the "type A" circuit.

The procedure for operation of the electrical apparatus embodying this invention with the "type B" circuit is identical to the operation described above in connection with the "type A" circuit. Thus, an electrical apparatus has been provided which adapts a service vehicle having either the "type A" or "type B" electrical circuit for electrically isolating a service vehicle generator from the service vehicle electrical system and impressing the output of said generator in a controlled manner onto the electrical system of a stalled vehicle.

It is to be understood that while certain forms of this invention have been illustrated and described, it is not to be limited to the specific form or arrangement of parts herein described and shown except insofar as such limitations are included in the claims.

What I claim and desire to secure by Letters Patent is:

1. Electrical apparatus adapted for assembly with an emergency service vehicle having an electrical system including a battery and an engine driven generator and a regulator, said generator having a field terminal and an output terminal, said regulator having a field terminal normally connected to said generator field terminal, said regulator having an input terminal normally connected to said generator output terminal, said regulator having an output terminal connected to said battery, said apparatus adapting said service vehicle for electrically isolating said service vehicle generator from the balance of the service vehicle electrical system and impressing the output of said generator onto a foreign electrical system, said apparatus comprising:

(a) current metering means and switch means and a pair of charging cables, (b) said switch means being adapted to electrically connect the output terminal of said generator to the input terminal of said current metering means and disconnect the output terminal of said generator from the regulator input terminal, (c) one of said charging cables being adapted for grounding with respect to said service vehicle, (d) the other of said charging cables being electrically connected to the output terminal of said current metering means, (e) said charging cables respectively terminating in means for connecting into the foreign electrical system whereby upon driving said generator current is available for the foreign electrical system.

2. The apparatus of claim 1 wherein:

(a) said switch means and said current measuring means are mounted on a panel, and (b) a pilot light is also mounted on said panel, (c) said pilot light being connected to said switch means second terminal and adapted to light when switch contact connects the output terminal of said generator to the input terminal of said current metering means, (d) said panel being adapted for mounting on said service vehicle.

3. The apparatus of claim 1 including:
(a) an engine throttle lock control adapted to selectively maintain the engine speed of said service vehicle at a desired rate for controlling the rotational speed of said generator during the charging of the foreign electrical system.

4. The apparatus of claim 1 wherein:
(a) said switch means comprises a manually operated switch and relay switching means, said manually operated switch being connected to said relay switching means for actuating same.

5. Electrical apparatus adapted for assembly with an emergency service vehicle having an electrical system including a battery and an engine driven generator and a regulator, said generator having a field terminal and an output terminal, said regulator having a field terminal normally connected to said generator field terminal, said regulator having an input terminal normally connected to said generator output terminal, said regulator having an output terminal connected to said battery, said apparatus adapting said service vehicle for electrically isolating said service vehicle generator from the balance of the service vehicle electrical system and impressing the output of said generator in a controlled manner onto a foreign electrical system, said apparatus comprising:
(a) a control switch and an ammeter and a relay switch bank and a pair of charging cables,
(b) said relay bank including a first relay switch having a coil and adapted to electrically connect the generator output terminal to the input terminal of said ammeter when said first relay switch coil is energized,
(c) said relay bank including a second relay switch having a coil and adapted to electrically disconnect the generator output terminal of said generator from the regulator load input terminal when said second relay switch coil is de-energized,
(d) said relay bank including a third relay switch having a coil and adapted to electrically connect the generator field terminal to the generator output terminal when said third relay switch coil is energized,
(e) said relay bank including a fourth relay switch having a coil and adapted to electrically disconnect the generator field terminal from the field terminal of the regulator when said fourth relay switch coil is de-energized,
(f) said control switch having a common terminal and first and second switch terminals, said common terminal being adapted for electrical connection to the battery of said service vehicle, said control switch first terminal being electrically connected to said second and fourth relay switch coils, said control switch second terminal being electrically connected to said first and third relay switch coils,
(g) said relay switch coils and one of said charging cables being adapted for grounding with respect to said service vehicle,
(h) the other of said charging cables being electrically connected to the output terminal of said ammeter,
(i) said charging cables respectively being adapted for connecting into the foreign electrical system, (j) whereby said generator may be selectively switched between normal service on said service vehicle and charging the foreign electrical system.

6. The apparatus of claim 5 wherein:
(a) said control switch and said ammeter are mounted on a panel, and
(b) a pilot light is also mounted on said panel,
(c) said pilot light being connected to said control switch second terminal and adapted to light when switch contact is made therewith,
(d) said panel being adapted for mounting on said service vehicle.

7. The apparatus of claim 5 including:
(a) an engine throttle lock control adapted to selectively maintain the engine speed of said service vehicle at a desired rate for controlling the rotational speed of said generator during the charging of the foreign electrical system.

8. Electrical apparatus adapted for assembly with an emergency service vehicle having an electrical system including a battery and an engine driven generator and a regulator, said generator having a field terminal and an output terminal, said regulator having a field terminal normally connected to said generator field terminal, said regulator having an input terminal normally connected to said generator output terminal, said regulator having an output terminal connected to said battery, said apparatus adapting said service vehicle for electrically isolating said service vehicle generator from the balance of the service vehicle electrical system and impressing the output of said generator in a controlled manner onto a foreign electrical system, said apparatus comprising:
(a) current metering means and switch means and a pair of charging cables and an engine throttle lock control,
(b) said switch means being adapted to selectively electrically connect the output terminal of said generator to the input terminal of said current metering means,
(c) said switch means being adapted to selectively electrically disconnect the output terminal of said generator from the regulator input terminal,
(d) said switch means being adapted to selectively electrically connect the generator field terminal to the generator output terminal,
(e) said switch means being adapted to selectively electrically disconnect the field terminal of said generator from the field terminal of the regulator,
(f) one of said charging cables being adapted for grounding with respect to said service vehicle,
(g) the other of said charging cables being electrically connected to the output terminal of said current metering means,
(h) said throttle lock control being adapted to selectively maintain the engine speed of said service vehicle at a desired rate for controlling the rotational speed of said generator,
(i) said charging cables respectively terminating in means for connecting into the foreign electrical system whereby a controlled current level is available for the foreign electrical system.

No references cited.